May 14, 1935.  H. E. BRUNNER  2,001,566
ANTIFRICTIONALLY MOUNTED SPINDLE
Filed May 11, 1933
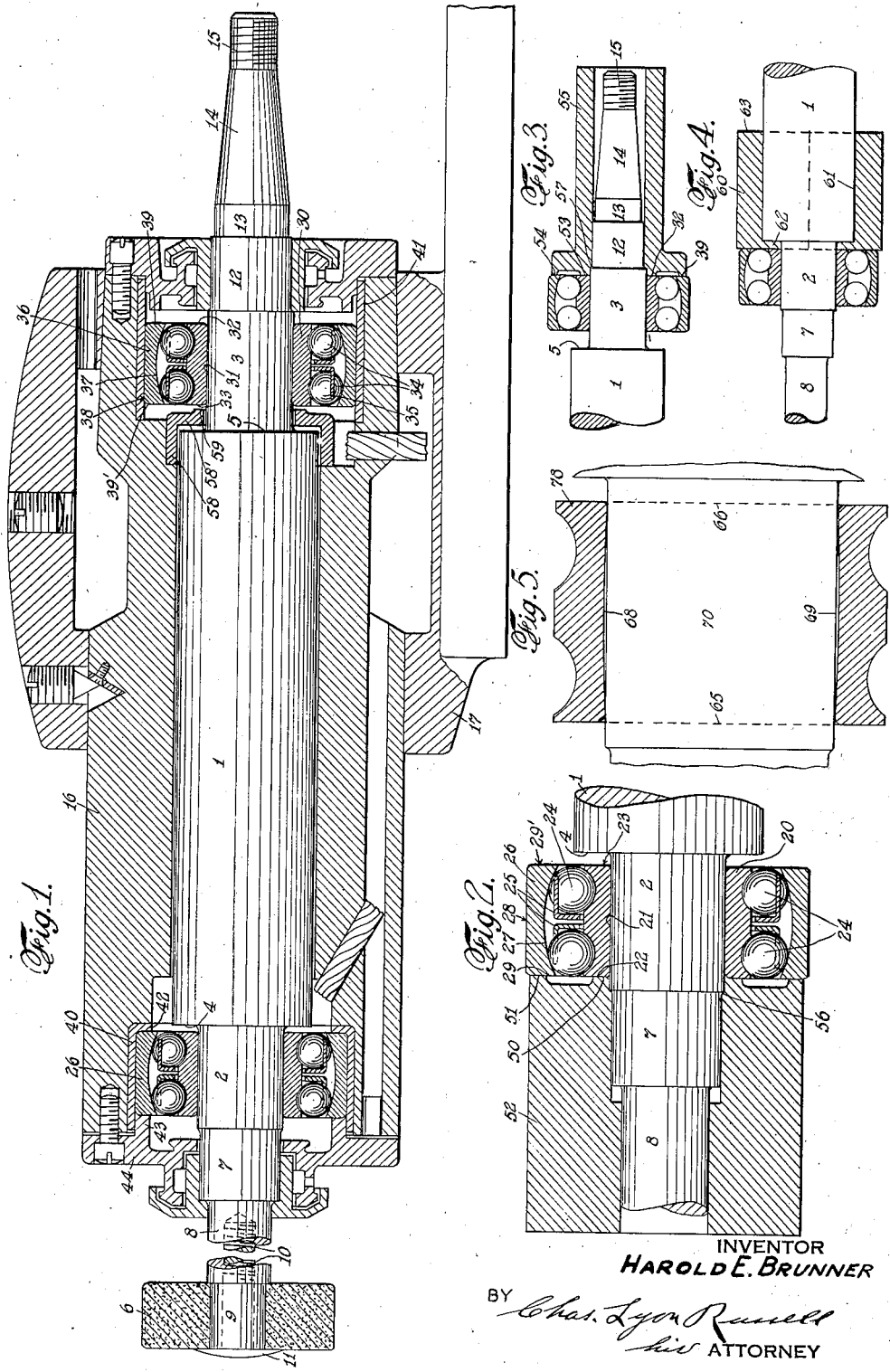
INVENTOR
HAROLD E. BRUNNER
BY
his ATTORNEY Patented May 14, 1935

2,001,566

UNITED STATES PATENT OFFICE 2,001,566

ANTIFRICTIONALLY MOUNTED SPINDLE

Harold E. Brunner, Larchmont, N. Y., assignor, by mesne assignments, to S K F Industries, Inc., Philadelphia, Pa., a corporation of Delaware Application May 11, 1933, Serial No. 670,397

11 Claims. (Cl. 308—189)

This invention relates to an improved mode of mounting spindles on anti-friction bearings, as for instance, the spindles of "wheel heads", and is particularly useful in such a mounting in which the shaft or spindle is intended for use in internal or bore grinding.

In carrying out my invention in this design I mount a spindle in a quill by means of two self-aligning anti-friction bearings, preferably ball bearings, having the cylindrical bores of their inner race rings tightly fitted upon cylindrical bearing seats formed at the respective ends of the body of the spindle, the end faces of each of such inner race rings being entirely open.

An object of the invention is that both end faces of the inner ring, or rotating ring, of each of the bearings shall be open in their entirety; that is, that each of these faces shall be free from all contact whatsoever, that they shall be free of contact from any other part of the structure and from contact with any abutment face or other portion of the spindle or with any clamping device.

It is an object of my invention that the end faces of each of the inner race rings of each of the bearings shall be open, clear and free.

Another object of the invention is to secure the rotating race ring of an anti-friction bearing to its bearing seat so that the end faces of such bearing ring do not contact with a shoulder adjacent the seat or with any clamping device, it being held in position by means of its bore tightly fitting the seat, either by a press fit or by a shrink fit, the tightness preferably being determined for such gripping of the race ring to its seat as to resist thrust loads and obtain the required internal adjustment of balls and races.

In mounting rotating work spindles I prefer to secure the inner race rings of the anti-friction bearings to bearing seats formed on the spindle so that the end faces of each of such inner bearing rings do not contact either with a shoulder on the spindle or with any clamping device, each ring being held in position by means of its bore fitting the seat as above described.

My purpose for mounting the rotating ring so that its ends are open and free is to obtain accuracy of the rotating supported member. Inaccuracy frequently is caused by an out of truth condition in spindle shoulders, locking nuts and washers, and the end faces of the inner rings of the bearings. When any one, or more, of these faces is not true, locking them all into intimate rigidity creates a condition of out of truth in the spindle.

Another purpose of this mode of bearing mounting is to effect economy in the number of parts necessarily employed, and the amount of labor expended in finishing the parts which are used, and to facilitate the replacement of new bearings and parts with the minimum of error occurring.

In the drawing accompanying this specification one practicable embodiment of my invention is illustrated, in which drawing:

Figure 1 shows in elevation a grinding spindle mounted in a wheel head according to my invention by means of two ball bearings, the ball bearings and the wheel head being shown in longitudinal section.

Fig. 2 is an enlarged view of the wheel end of the spindle and of the bearing mounted upon it and also shows a mounting tool for the bearing at that end of the spindle.

Fig. 3 shows a similar view but on a more reduced scale of the bearing and the other end of the spindle and its mounting tool.

Fig. 4 shows the removal tool for the wheel end bearing, and

Fig. 5 shows details in exaggerated proportions, illustrating a relative formation of an inner bearing ring bore and its spindle seat as an expedient which may be adopted when it is not practical to generate these surfaces as true cylinders.

The spindle illustrated has a central portion 1 substantially cylindrical. At each end of this central portion the spindle is shown reduced. The necks thus formed are finished as cylindrical bearing seats 2 and 3, there being represented radially disposed shoulders 4 and 5 inwardly of these bearing seats or necks.

In the illustration the end of the spindle at the left hand side of the drawing is intended to carry a grinding wheel 6. The spindle at this end is reduced into a cylindrical portion 7 outwardly of the neck 2, a further cylindrical portion 8 and a further reduced portion 9 at the end for receiving the grinding wheel 6. Shoulders are formed inwardly of each of these reductions. The grinding wheel is shown held against the shoulder inwardly of the portion 9 in a conventional manner, namely, the left hand screw 10 having a substantially flat head 11 engaging the outer face of the grinding wheel.

The pulley end of the spindle is represented at the right hand side of the drawing, the spindle having two cylindrical reductions 12 and 13, shoulders being formed inwardly of these reductions, the spindle extending in a tapering portion 14 at the end of the reduction 13, such tapering portion being a conventional seat for a pulley, not shown. A screw thread is represented at 15 for receiving a nut for clamping the pulley up on the seat 14.

The necks 2 and 3, or rather the bearing seats which are formed upon them, are mounted in anti-friction bearings, presently to be described, which bearings are mounted in the ends of a quill 16. The internal bore of the quill closely approaches the perimeter of the central portion 1 of the spindle, ample clearance being provided. In practice the quill is made of duralumin and is shown mounted in the carriage or head portion 17 of well-known construction. According to prevailing practice the spindle is stabilized in an axial direction at the grinding wheel end, the other end being mounted to move freely within the quill incident to expansion and contraction of the spindle relative to the quill.

The spindle is preferably made of heat treated alloy steel, machined, and the seats 2 and 3 are ground to size. It is important that these seats be held within a close diametrical tolerance, for instance, .0002″ with respect to the bore of the inner rings of the bearings.

The bearings which are illustrated are known as wide series self-aligning ball bearings. Altho in practice I prefer that these two bearings shall be identical and interchangeable, yet for convenience of the present specification, each of them will be individually described.

The self-aligning ball bearing at the grinding wheel end of the spindle, left hand side in the drawing, that is the end of the spindle which I prefer to stabilize, comprises an inner race ring 20 having a cylindrical bore 21 and two end faces 22 and 23. Two suitable raceway grooves are formed in the perimeter of this ring for receiving two sets of balls 24 which are shown as individually separated by cages 25. The outer race ring 26 is shown formed with a hollow spherical face 27 upon which the balls track when the spindle rotates in relation to the quill and upon which they roll in self-aligning, when the spindle tilts in relation to the quill. The outer perimeter 28 of this outer race member 26 is shown as being substantially cylindrical. The ring is also shown having end faces 29 and 29′.

A similar description is applicable to the ball bearing at the pulley or right hand side of the drawing, reference characters 30 to 39′ being applied.

Considering the device in its set up position, that is with the spindle mounted on the ball bearings which are mounted within the quill as represented in Figure 1, the manner of mounting the parts will be passed over for the moment but it will be assumed that the inner race ring 20 has its bore tightly mounted upon the spindle bearing seat 2 and that no clamping device whatsoever is used to keep the bearing from backing off of the bearing seat 2 on the neck, whereby the end face 22 of such inner race ring is open, clear and free and that such inner ring 20 is mounted in such a position on the bearing seat 2 that its inner end face 23 is entirely free and clear of the shoulder 24 and is entirely open, no spacers or other devices being interposed between the end face 23 of the bearing ring and the face of the shoulder 4.

I regard it as the better practice in these bearings that neither of the end diameters of the bore shall vary from the other. Diameters intermediate the ends must not be smaller but may be larger than at the ends. The ideal bearing has a true cylindrical bore. If a true cylinder is departed from, the tolerances must be as just indicated. This is illustrated in a separate view, Fig. 5, in exaggerated proportions, since the variations are too minute to be indicated in the main views. The end diameters 65—66 of the bore of the bearing ring 78 are equal. The intermediate diameter 68 is larger than the end diameters. The bearing seat 69 on the spindle 70 is illustrated as a true cylinder.

Similarly it is assumed that the inner race ring 30 of the bearing at the pulley side of the spindle has its cylindrical bore 31 mounted tightly upon the bearing seat 3 of the spindle neck, there being no clamping nuts or other devices engaging the outer face 32 of the outer end of such ring and the inner end face 33 of such ring being entirely free and clear of the face of the spindle shoulder 5. Each end of this ring is also open, free and clear. This is the construction which is referred to in an introductory portion of the description in which I state that it is an object of my invention that the end faces of each of the rotating race rings of each of the bearings shall be open, free and clear. So far as I am aware, no one heretofore has ever mounted a spindle in such a manner upon two self-aligning anti-friction bearings.

The employment of two self-aligning bearings prevents the distortion of the spindle through loads being imposed on the spindle from temperature rises in the quill, very often resulting in temperature gradients.

The outer race rings 26 and 36 of the bearings are shown mounted in bearing seats formed in the ends of the quill member. This quill member is preferably made of duralumin instead of cast iron or mild steel which is the material common to prevailing types of wheel heads. It has been found desirable to reinforce the seats with steel liners 40 and 41 as a precaution against possible peening or enlargement from scrubbing action in operating service. These liners are preferably pressed into place after which the finished bore diameter is produced by grinding. The press fit allowance used is in excess of the difference between the expansion of the two metals as a precaution against their loosening during operation.

In manufacturing the ball bearings, after the bore of the inner race ring has been finished it is mounted fairly tightly on a cylindrical arbor, the end faces of the ring being entirely free. The race grooves are then ground normal to the axis of the perimeter of the bore of the ring which will be normal to the axis of the bearing seats formed on the spindle. This grinding or forming operation has no reference to the shape or angle of the end faces of the ring.

Owing to the fact that the outer ring of the bearing which contains the outer raceway for the ball is a segment of a sphere, it does not matter how carefully or otherwise the end faces of such ring are formed. The outer ring is locked up tight in the quill and the balls may track upon this spherical face wherever they find it.

The outer race ring 26 of the bearing in the left hand end of the illustration is locked between the inturned end 42 of its seat liner 40 and an annular flange 43 carried by the end cover 44. The quill seats are preferably held within a tolerance of .0004″ of the outer race rings 26 and 36 of the bearing. If one is manufacturing the bearings in respect to the spindle and quill, of course these same tolerances will be observed in the bore and outside diameter of the bearings.

The outer ring 36 of the bearing at the pulley end of the spindle is shown mounted so that it may freely move longitudinally within its bearing seat, that is in the illustration the seat within the liner 41.

By means of this form of mounting the parts employed are greatly reduced in number. The most important feature of simplification is the use of only two ball bearings as well as the type selected for the spindle supports. With the use of wide, medium series, self-aligning bearings mounted in accordance with this method all extreme accuracy of spindle shoulders is dispensed with. No locknuts or extremely accurate spacer sleeves and properly calibrated spring parts are required. These self-aligning bearings are standard type and dimensionally they conform with established precision specifications. With their use bearing economy is effected as will be seen by a comparison of their cost with that of the matched, rigid, special type now generally required. Additional economies are also effected in the production of the balance of the wheel head elements and the time required. Since the self-aligning type of bearing possesses the quality of self-adjustment to misalignment resulting from either mechanical error or direct possible warpage of parts from operating heat, close dimensional accuracy need only be maintained on the diameter of the bearing seats on the spindle and in the quill housing.

The bearings are preferably mounted upon the seats 2 and 3 of the spindle and within the seats in the quill at the same time. The mounting may be a shrink fit or a press fit, whichever is indicated by the size of the structure and the severity of the work to be performed. In mounting, the spindle is placed within the quill in about its proper longitudinal position, the ball bearings are introduced from the respective ends, the faces 22 and 29 of the rings of the bearing at the left hand end are engaged by faces 50 and 51 of a mounting tool 52 which in practice will be engaged by a fixed member of a hydraulic press. Undoubtedly in the mounting operation the spindle will assume a vertical position. The faces 32 and 39 of the rings of the bearing at the other end of the shaft will be engaged by faces 53 and 54 of a mounting tool 55 which will be engaged generally by the plunger or movable member of the hydraulic press. The tool 52 has a shoulder 56 located in position to engage the shoulder between the neck 2 and the reduced portions 7 when the inner bearing ring 20 has been advanced to the proper position upon the bearing seat on this neck and the mounting tool 55 has a shoulder 57 for engaging the shoulder between the neck 3 and the reduced portion 12 for similar purposes. Owing to the fact that the outer faces of both rings of each bearing are engaged by the mounting tool during the mounting operation, no strain is placed upon the rolling elements of the bearings.

To assist in taking the bearing apart I preferably mount in the quill inwardly of the housing for receiving the bearing at the pulley end a stripping or push-off collar 58 which has a light press fit in a cavity formed within the bore of the quill and has an inwardly extending end 58' formed with a shoulder or face 59 for engaging the inner end face 33 of the bearing ring 30 when it is desired to demount the spindle. Of course, for practicing this operation the end covers will be removed and pressure preferably applied to the pulley end 15 of the spindle. Upon the removal of the end cover 46 the outer ring 26 of the stabilized bearing will generally be free, or practically so, to move out of the liner 40 and the outer ring 26 of the other bearing will also be free to move so that upon the application of pressure the inner ring 30 is stripped off its seat 3 and the other bearing is carried outwardly of the quill because of its tight fit upon the seat 2. The bearing ring 20 may then be stripped from its seat 2 by means of the stripping or demounting tool 60 represented in Figure 4, this tool being formed in two parts and provided with a bore 61 permitting it to rest easily upon the perimeter of the central portion 1 of the spindle and also having an inwardly projecting flange 62 which enters the space between the end face 4 of the enlarged portion of the spindle and the face 23 of the inner ring 20 of the bearing. Then merely by supporting the free end 63 of the stripping tool and applying pressure to the end of the spindle, the bearing inner ring is stripped off the bearing seat of the spindle.

In carrying out my invention, I prefer to use a double row, or rather a two row, ball bearing at each end of the spindle. While a rigid type of a two row bearing may be employed in some installations, yet for other applications including a grinding wheel spindle I prefer to use a two row wide series self-aligning ball bearing, largely because of the fact that such a bearing will compensate for the parasitic stresses and loads which are imparted to a spindle of this kind principally from the quill during operation and also because in a two row self-aligning anti-friction bearing the radial load is evenly distributed between the two rows of rolling elements.

Having thus described my invention I claim and desire to secure by Letters Patent:

1. The combination with a spindle having at each end a neck formed on its perimeter with a cylindrical bearing seat, of a quill having hollow cylindrical bearing seats formed at its respective ends, and two self-aligning anti-friction bearings having cylindrical bores in their inner rings tightly fitted upon the bearing seats of the spindle necks, the end faces of each of such inner race rings being entirely open, clear and free, the outer rings being entirely open, clear and free, the outer race rings of such bearings being mounted in the bearing seats formed in the quill.

2. The combination with a spindle having at each end a neck formed on its perimeter with a cylindrical bearing seat, of a quill having hollow cylindrical bearing seats formed at its respective ends, and two self-aligning ball bearings having cylindrical bores in their inner rings tightly fitted upon the bearing seats of the spindle necks, the end faces of each of such inner race rings being entirely open, clear and free, the outer race rings of such bearings being mounted in the bearing seats formed in the quill, and means for locking one of such outer race rings in its quill seat for stabilizing the spindle at that end.

3. The combination with a spindle having formed on its perimeter at each end a cylindrical bearing seat, of a quill having hollow cylindrical bearing seats formed at its respective ends and two two row self-aligning ball bearings having cylindrical bores in their inner rings tightly fitted upon the bearing seats on the spindle, the end faces of each of such inner race rings being entirely open, clear and free, the outer race rings of such bearings being mounted in the bearing seats formed in the quill.

4. The combination with a spindle having formed on its perimeter at each end a cylindrical bearing seat, of a quill having hollow cylindrical bearing seats formed at its respective ends, and two ball bearings having cylindrical bores in their inner rings tightly fitted upon the bearing seats on the spindle, the end faces of each of such inner race rings being entirely open, clear and free, the outer race rings of such bearings being mounted in the bearing seats formed in the quill, and means for locking one of such outer race rings in its quill seat for stabilizing the spindle at that end.

5. The combination with a quill formed interiorly adjacent each of its respective ends with a cylindrical bearing seat, of a pair of radial self-aligning ball bearings having their outer rings formed with exterior cylindrical faces mounted in the bearing seats at the ends of the quill, a spindle having its body portion located within the quill and having formed adjacent each end on its perimeter a cylindrical bearing seat, the inner rings of the respective bearings having cylindrical bores and being tightly mounted on the respective bearing seats, each end of each of such inner rings being open.

6. The combination with a quill formed interiorly adjacent each of its respective ends with a bearing seat, of a pair of radial self-aligning anti-friction bearings having their outer race rings respectively mounted on bearing seats at the ends of the quill, a spindle having its body portion located within the quill and having at each end a neck formed on its perimeter with a bearing seat, the inner race rings of the respective bearings being tightly mounted on the spindle neck seats respectively, both ends of each ring being open.

7. The combination with a quill formed interiorly adjacent each of its respective ends with a bearing seat, of a pair of radial self-aligning anti-friction bearings having their outer rings respectively mounted on the bearing seats at the ends of the quill, a spindle having its body portion located within the quill and having at each end a neck formed on its perimeter with a bearing seat, there being a shoulder formed inwardly of each of the bearing seats, the inner race rings of the respective bearings being tightly mounted on the spindle neck seats respectively, their inner ends being located clear of the adjacent shoulders.

8. The combination with a spindle having formed on its perimeter at each end a cylindrical bearing seat, of a quill having hollow cylindrical bearing seats formed at its respective ends, and two self-aligning bearings having cylindrical surfaces on their outer perimeters and cylindrical bores, such bearings being mounted in the bearing seats formed in the quill, their bores having press fits on the bearing seats on the spindle.

9. The combination with a spindle having formed on its perimeter at each end a cylindrical bearing seat, of a quill having hollow cylindrical bearing seats formed at its respective ends, and two self-aligning bearings having cylindrical surfaces on their outer perimeters and cylindrical bores, such bearings being mounted in the bearing seats formed in the quill, their bores having press fits on the bearing seats on the spindle.

10. The combination with a spindle having at each end a neck formed on its perimeter with a cylindrical bearing seat, of a quill having hollow cylindrical bearing seats formed at its respective ends, and two self-aligning anti-friction bearings having cylindrical bores in their inner rings tightly fitted upon the bearing seats of the spindle necks, the end faces of each of such inner race rings being entirely open, clear and free, the outer race rings of such bearings being mounted in the bearing seats formed in the quill, and a stripper carried by the quill and having a portion extending toward one of the spindle bearing seats inwardly of the inner end face of the inner race ring mounted thereon.

11. The combinaton with a spindle having at each end a neck formed on its perimeter with a cylindrical bearing seat, of a quill having hollow cylindrical bearing seats formed at its respective ends, and two self-aligning ball bearings having cylindrical bores in their inner rings tightly fitted upon the bearing seats of the spindle necks, the end faces of each of such inner race rings being entirely open, clear and free, the outer race rings of such bearings being mounted in the bearing seats formed in the quill, means for locating one of such outer race ring, the other of such outer race ring having a floating fit on its quill seat, and a stripper carried by the quill adjacent the floating ring and having a portion extending toward the spindle bearing seat inwardly of the inner end face of the inner race ring mounted thereon.

HAROLD E. BRUNNER.